United States Patent
Jia et al.

(10) Patent No.: US 9,064,172 B2
(45) Date of Patent: Jun. 23, 2015

(54) SYSTEM AND METHOD FOR OBJECT DETECTION

(75) Inventors: Zhen Jia, Shanghai (CN); Ziyou Xiong, Wethersfield, CT (US); Hongcheng Wang, Farmington, CT (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 270 days.

(21) Appl. No.: 13/878,188

(22) PCT Filed: Oct. 5, 2010

(86) PCT No.: PCT/US2010/051449
§ 371 (c)(1),
(2), (4) Date: Jun. 17, 2013

(87) PCT Pub. No.: WO2012/047202
PCT Pub. Date: Apr. 12, 2012

(65) Prior Publication Data
US 2013/0265421 A1  Oct. 10, 2013

(51) Int. Cl.
*G06K 9/34* (2006.01)
*G06K 9/32* (2006.01)
*G06K 9/00* (2006.01)
*H04N 7/18* (2006.01)

(52) U.S. Cl.
CPC .......... *G06K 9/3233* (2013.01); *G06K 9/00221* (2013.01); *G06K 9/00241* (2013.01); *G06K 9/00248* (2013.01); *G06K 9/00369* (2013.01); *G06K 9/00375* (2013.01); *H04N 7/18* (2013.01)

(58) Field of Classification Search
CPC .......... G06K 9/00221; G06K 9/00281; G06K 9/00288; G06T 7/20
See application file for complete search history.

(56) References Cited

U.S. PATENT DOCUMENTS

| | | | |
|---|---|---|---|
| 7,295,684 B2* | 11/2007 | Tsujino et al. | 382/107 |
| 7,940,985 B2* | 5/2011 | Sun et al. | 382/173 |
| 7,973,834 B2* | 7/2011 | Yang | 348/240.3 |
| 2005/0248654 A1 | 11/2005 | Tsujino et al. | |
| 2008/0219558 A1* | 9/2008 | Lu et al. | 382/190 |
| 2008/0304740 A1 | 12/2008 | Sun et al. | |
| 2009/0080695 A1 | 3/2009 | Yang | |

* cited by examiner

*Primary Examiner* — Utpal Shah
(74) *Attorney, Agent, or Firm* — Cantor Colburn LLP

(57) ABSTRACT

The present invention therefore provides a system and method of object detection that employs both global object detection and local object detection. In particular, the present invention applies global object detection techniques to detect global objects, and then applies local object detection techniques on select portions of detected global objects to detect local objects.

15 Claims, 3 Drawing Sheets

SYSTEM AND METHOD FOR OBJECT DETECTION

BACKGROUND

The present invention is related to computer vision, and in particular to object detection and recognition using computer vision.

Computer vision techniques for providing object detection and recognition are employed in a plurality of applications such as video surveillance. Object detection refers to computer vision techniques employed to detect the presence or absence of an object within an image. Object recognition refers to computer vision techniques for recognizing/identifying detected objects. For example, object detection techniques may be used to identify the presence of a person in an image, wherein object recognition techniques would be used to detect the identity of the detected person.

Prior art methods of computer vision object detection typically employ either global object detection techniques or local object detection techniques. Global object detection refers generally to computer vision techniques for detecting major objects from entire images or sequence of images. For example, global object detection techniques allow a computer to detect the presence of objects such as people or vehicles within a particular image. Local object detection employs processes that analyze local aspects of an image to detect and recognize objects. In general, local object detection is more useful for identifying/recognizing objects. For example, local object detection and recognition may be employed to recognize facial features employed to identify a particular person.

However, the performance of local object detection algorithms decreases in uncooperative environments, such as those in which there are resolution, frame rate, illumination, or obscuration issues. Prior art solutions to these problems focus on how to enhance the quality of the detected images (i.e., improve the resolution, illumination, etc.) in order to improve the quality of the local object detection. While useful, these tools are not always successful.

SUMMARY

The present invention provides a system and method of object detection that employs both global object detection and local object detection. In particular, the present invention applies global object detection techniques to detect global objects, and then applies local object detection techniques on select portions of detected global objects to detect local objects. The result of the local object detection is provided as feedback to correct errors associated with the detected global objects. In this way, the present invention reduces errors associated with the detection of both local objects and global objects.

DETAILED DESCRIPTION

The present invention provides a system and method for combining global and local object detection techniques to improve the overall performance of computer vision object detection and recognition. In particular, the present invention detects global objects within an image or series of images, identifies local regions of interest within the detected global objects, and detects local objects within the identified local regions of interest. In this way, the present invention reduces false alarms associated with local objects detected outside of global objects. In addition, the present invention may provide detected local objects in feedback to correct detected global objects, thereby reducing false alarms associated with detected global objects.

Figure 1:
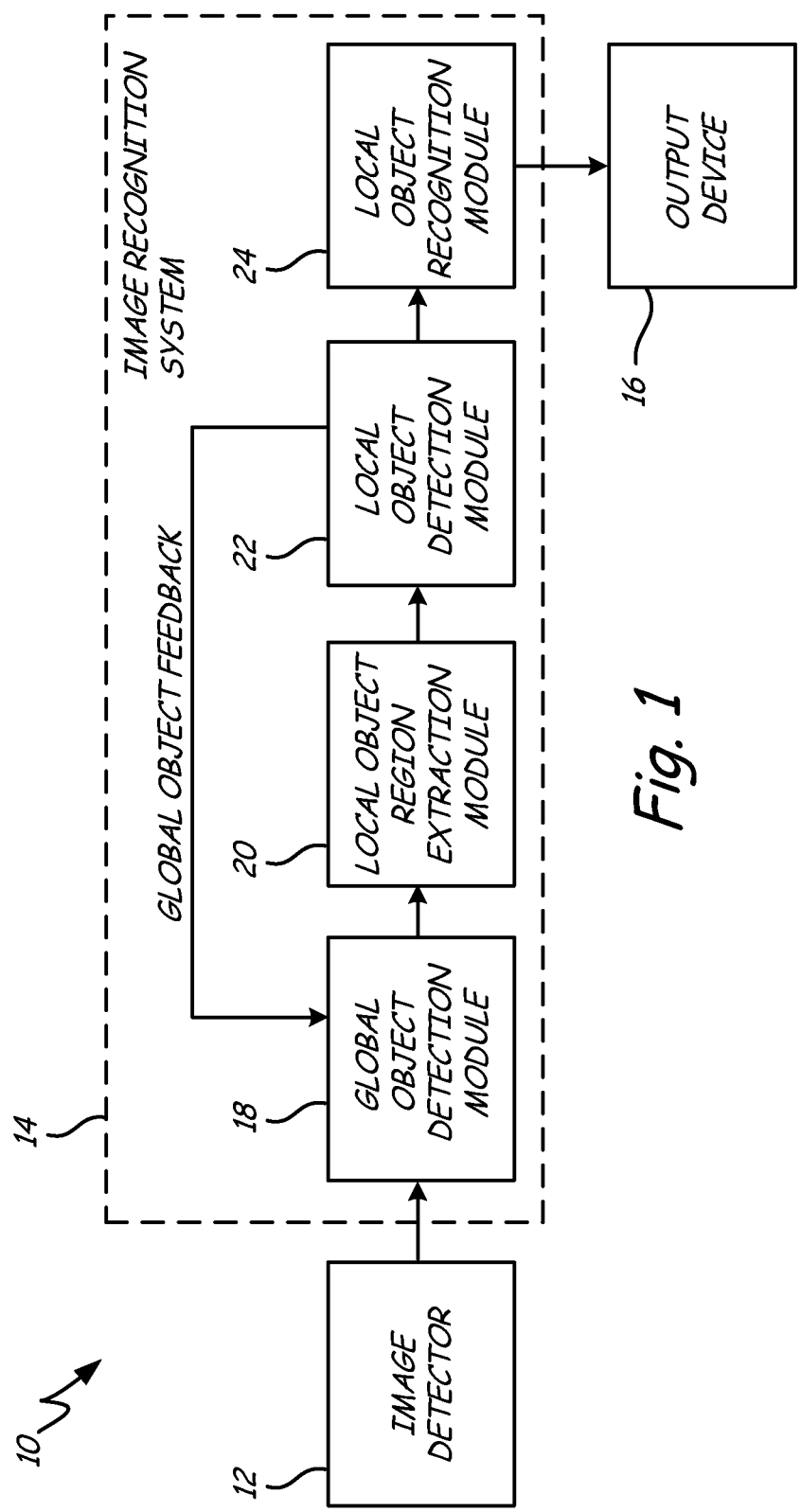
FIG. 1 is a functional block diagram of a computer vision system for providing object detection according to an embodiment of the present invention.

FIG. 1 is a functional block diagram of computer vision system 10 for providing object detection according to an embodiment of the present invention. Computer vision system 10 includes image detector 12, image recognition system 14 and output device 16. Image detector 12 may includes a camera for capturing a single image or a video detector for capturing a series of successive images. An image or series of images captured by image detector 12 is communicated to image recognition system 14. The provision of images by image detector 12 to image recognition system 14 may be by any of a number of means, e.g., by a hardwired connection, over a dedicated wireless network, over a shared wireless network, etc. Hardware included within image recognition system 14 includes, but is not limited to, a video processor as well as memory. Software included within image recognition system 14 includes image content analysis software for implementing each of the functional modules shown in FIG. 1.

Image recognition system 14 includes, but is not limited to, global object detection module 18, local object region extraction module 20, local object detection module 22, and local object recognition module 24. Global object detection module 18 operates on an entire image or series of images provided by image detector 12, and includes an algorithm or algorithms for detecting the presence of global objects within the image or series of images. For example, global object detection algorithms may analyze an image to detect the presence of people, vehicles, or other objects of interest. A plurality of global object detection algorithms are known in the art for detecting various types of objects, such as people and/or vehicles. Examples of global object detection algorithms include those described in "Pedestrian Detection Using Boosted Features Over Many Frames" by Jones, M,; and Snow, D., *International Conference on Pattern Recognition (ICPR), Motion, Tracking, Video Analysis*, December 2008; "Detecting Pedestrians Using Patterns of Motion and Appearance", Viola, P.; Jones, M. J; Snow, D. *IEEE International Conference on Computer Vision (ICCV)*, Vol. 2, pp. 734-741, October 2003; and "Vision-Based Preceding Vehicle Detection and Tracking", Chih-Ming Fu; Chung-Lin Huang; Yi-Sheng Chen, 18th International Conference on Pattern Recognition, 2006, Volume 2, Issue, 0-0, Pages 1070-1073.

Having detected objects globally within a particular image or series of images, the portion of the image representing the detected global object is provided to local object extraction module 20, which relies on known relationships between detected global objects and local objects to extract regions within the global object that may contain local objects. For example, in one application the global object to be detected is a person, and the local object to be detected is a person's face. In this example, global object detection module 18 detects the presence of a person within a given image. The portion of an image in which the person is detected (i.e., the detected global object) is passed to local object region extraction module 20, which relies on geographic relationships between a person and the (likely) location of a person's head on top of their body to extract the portion of the global object most likely containing the person's head (e.g., the top one-third of the detected global object). The extracted portions of the global object are referred to herein as "local regions of interest." In the example provided, the local region of interest (ROI) would include the top one-third portion of the detected global objects. In other embodiments, other relationships between the detected global objects and local objects may be applied for selecting the local region of interest. For example, with respect to embodiments in which global objection detection module 18 detects vehicles, local object region extraction module 20 may identify the portion of the vehicle likely representing a license plate as the local region of interest.

Identified local ROIs are provided to local object detection module 22 for further processing to detect local objects. In the example provided above, local object detection module 22 would process the local regions of interest (e.g., top one-third of detected global objects) in an attempt to detect local objects (e.g., faces). A plurality of local object detection algorithms are known in the art for detecting various types of local objects. Examples of local object detection algorithms include those described in "Automatic Eye Detection and Validation, Computer vision and Pattern Recognition—Workshops", Peng Wang Green, M. B., Qiang Ji Wayman, *IEEE Computer Society Conference—CVPR Workshops*, Published Jun. 25, 2005, page 164; "Robust Real-Time Face Detection", Viola, Paul and Jones, Michael, *International Journal of Computer Vision*, 137-154, Volume 57, Number 2/May 2004; "Multiple License Plate Detection for Complex Background", Ching-Tang Hsieh, Yu-Shan Juan, Kuo-Ming Hung, AINA 2005, 19$^{th}$ *International Conference on Advanced Information Networking and Applications*, Volume 2, March 2005, Pages 389-392.

A benefit of analyzing selected regions of interest within global objects for local objects, as opposed to analyzing an entire image for local objects, is the ability to reduce false alarms associated with detected local objects located outside of the region of interest. For example, applying a local object detection algorithm to an entire image for detecting the presence of a person's face may result in the detection of a photograph of somebody sitting on a desk. The present invention avoids this type of false alarm by relying on the detected global objects and the relationship between global objects and local objects to select for local object processing only those regions in which local objects are likely to be found.

Local object detection module 22 provides outputs that include detected global and local objects as well as global object feedback. Global object feedback is provided to global object detection module 18 to correct improperly detected global objects. Feedback is based on the assumption that if the local object detection algorithm is unable to detect a local object within a global object, then the detected global object may be a false alarm. For example, if global object detection module 18 detects a person, but subsequent local object analysis of the detected person (and in particular the region of interest identified by local object region extraction module 20) by local object detection module 22 determines that the region of interest does not include a face, then feedback provided by local object detection module 22 communicates the possibility of a false alarm in the detected global object to global object detection module 18. Global object correction through local object detection feedback may be applied singularly or iteratively to correct errors in the detected global objects.

In this way, the present invention takes advantage of global object detection to reduce errors in local objects detected, and may also employ local object detection to reduce errors in global objects detected. In addition, because local object detection algorithms applied by local object detection module 22 is only applied to local ROIs, the processing required to perform local object detection is reduced as compared to prior art methods that applied local object detection algorithms to the entire image or series of images.

Local objects detected by local object detection module 22 are further analyzed by local object recognition module 24, which acts to recognize or identify detected local objects. For example, local object recognition module 24 may analyze a face detected by local object detection module 22 in an attempt to identify the person, or if the local object detected by local object detection module 22 is a license plate, local object recognition module 24 would seek to identify the letters and/or numbers associated with the license plate. Depending on the application, various types of local object recognition algorithms may be employed to recognize or identify local objects, such as well-known facial recognition algorithms for identifying faces, or well-known character recognition algorithms for recognizing characters. These examples are not provided to limit the applications of the present invention, merely to highlight several of the potential applications.

Local object recognition module 24 generates outputs that are provided to output device 16. Outputs may include detected global objects, detected local objects, identifying information relating to detected global and local objects, and information regarding corrections made to detected global objects. The provision of outputs from image recognition system 12 to output device 16 may be by any of a number of means, e.g., by a hardwired connection, over a dedicated wireless network, over a shared wireless network, etc. Output device 16 may provide functions such as displaying, storing, and/or alerting a user to the results of the image analysis. For example, output device may be a display such as a monitor for visually communicating the detected objects, or may be an alarm for alerting a user to the presence of detected objects (e.g., unauthorized personnel, etc.).

Figure 2:
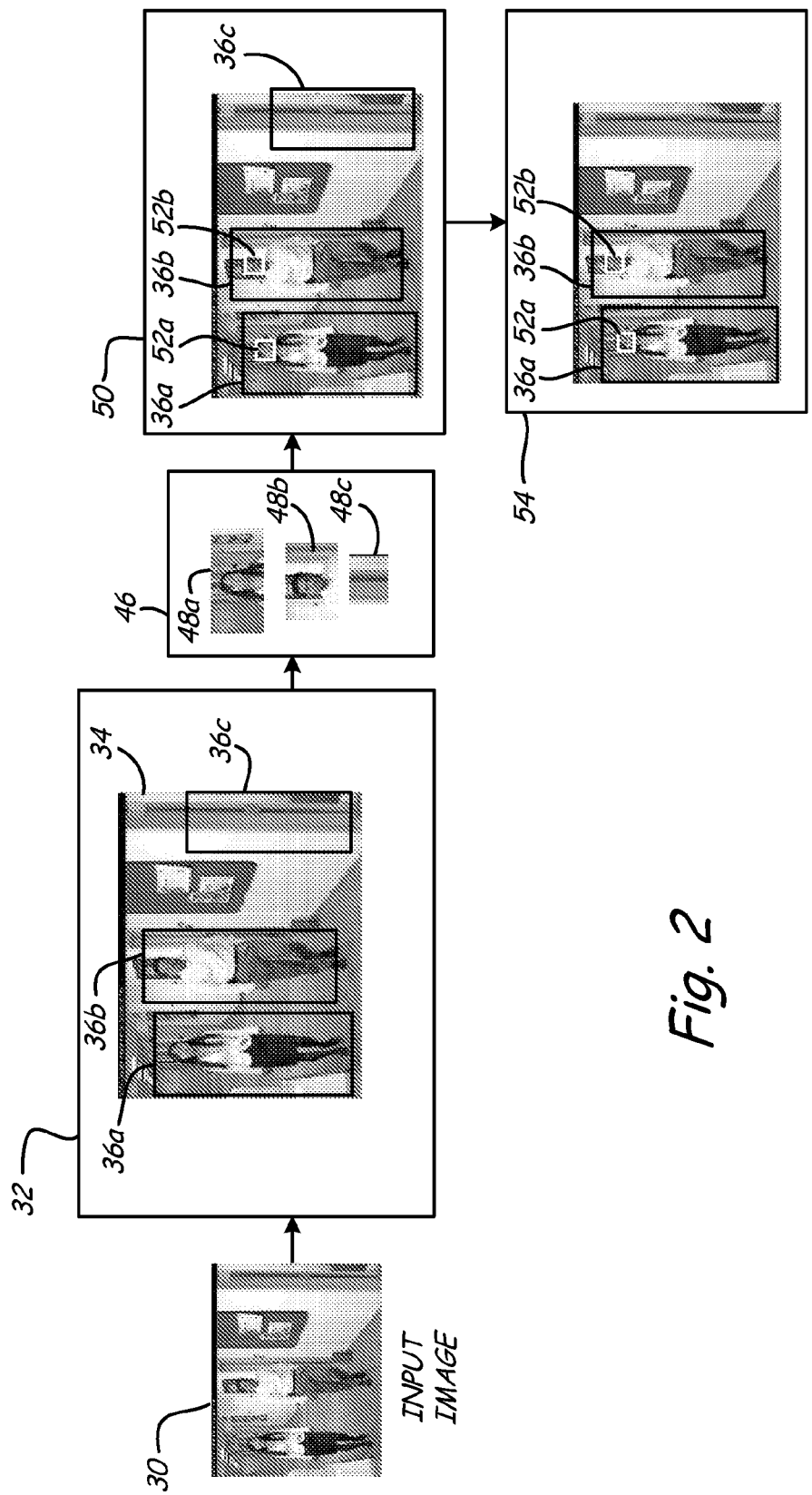
FIG. 2 is a flowchart illustrating analysis of an image according to an embodiment of the present invention.

FIG. 2 is a flowchart illustrating analysis of a video image by image recognition system 14 (as shown in FIG. 1) according to an embodiment of the present invention. At step 30, image recognition system 14 receives an image captured by image detector 12. At step 32, global object detection module 18 applies global object detection algorithms to detect the presence of people within the received image. Depending on the application and the global objects to be detected, a plurality of well-known global object detection techniques/algorithms may be employed to identify the desired global objects. At this step, image 34 is shown with three globally identified objects (e.g., people), labeled 36*a*, 36*b*, and 36*c*. Global objects 36*a* and 36*b* are correctly identified persons, while global object 36*c* is incorrectly identified as a person.

At step 46, local object region extraction module 20 extracts local regions of interest 48*a*, 48*b*, and 48*c* from detected global objects 36*a*, 36*b*, and 36*c*, respectively. In this example, the local object to be detected is a person's face. Based on the known relationship between the likely location of a person's face with respect to the rest of their body, local object region extraction module 20 selects the top one-third of detected global objects 36*a*, 36*b*, and 36*c* as local regions of interest.

At step 50, local object detection module 22 applies local object detection algorithms to local regions of interest 48*a*, 48*b*, and 48*c*. As a result of this analysis, local objects 52*a* and 52*b* are detected with respect to global objects 36*a* and 36*b*, respectively. No local object is detected with respect to detected global object 36*c*. In response, local object detection module 22 provides feedback to global object detection module 18 notifying the global object detection module of the lack of local objects within global object 36*c*. In response, global object detection module 18 corrects the detection of global object 36*c*. The final result of the analysis is provided at step 54, which illustrates detected global objects 36*a* and 36*b*, and detected local objects 52*a* and 52*b*, respectively. In particular, the present invention prevents false alarms associated with the improper detection of global object 36*c*.

Figure 3:
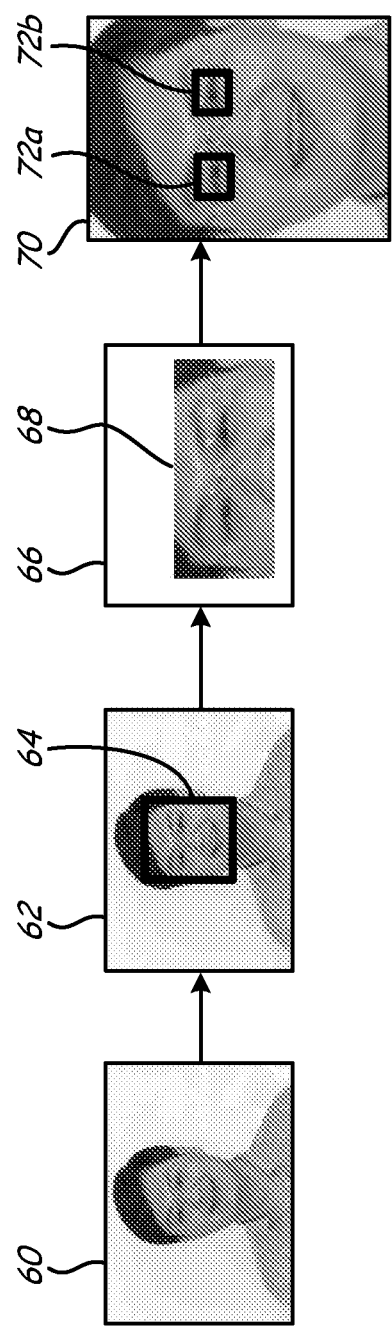
FIG. 3 is a flowchart illustrating the analysis of an image according to another embodiment of the present invention.

FIG. 3 is a flowchart illustrating analysis of a video image by image recognition system 14 (as shown in FIG. 1) according to another embodiment of the present invention in which global object detection module 18 operates to detect a person's face, and local object detection module 22 operates to detect eyes within a detected face. This example illustrates that the terms 'global' and 'local' are relative to one another. In one embodiment, the term 'global' may refer to a person, and the term 'local' may refer to the person's face, while in another embodiment the term 'global' may refer to a person's face, and the term 'local' may refer to an aspect of the person's face, such as the person's eyes.

At step 60, an image is provided by image detector 12 to image recognition system 14. At step 62, global object detection module 18 detects global object 64 within the received image. In this embodiment, global object detection module 18 operates to detect a person's face. At step 66, detected global object 64 is provided to local object region extraction module 20, which based on prior knowledge regarding the likely location of a local object within a global object (i.e., likely location of a person's eyes within their face), selects a local region of interest 68. At step 70, based on the selected local region of interest, local object detection module 22 detects local objects 72*a* and 72*b* (i.e., the person's eyes).

The present invention therefore provides a system and method of object detection that employs both global object detection and local object detection. In particular, the present invention applies global object detection techniques to detect global objects, and then applies local object detection techniques on select portions of detected global objects to detect local objects. This reduces the size of the image that must be analyzed for local object detection and reduces errors associated with local object detection. In addition, the result of the local object detection is provided as feedback to correct errors associated with the detected global objects. In this way, the present invention reduces errors associated with the detection of both local objects and global objects.

Although the present invention has been described with reference to preferred embodiments, workers skilled in the art will recognize that changes may be made in form and detail without departing from the spirit and scope of the invention.

The invention claimed is:

1. An image recognition system for detecting global and local objects within a received image, the system comprising:
   a global object detection module for detecting global objects within the received image;
   a local object region extraction module for selecting local regions of interest within the detected global objects; and
   a local object detection module for detecting local objects within the selected local regions of interest, wherein the local object detection module provides feedback to the global object detection, wherein the feedback is employed by the global object detection module to correct errors in the detected global objects.

2. The image recognition system of claim 1, wherein the local object region extraction module selected local regions of interest within the detected global objects based on a known relationship between global objects and local objects to be detected.

3. The image recognition system of claim 1, wherein the feedback provided by the local object detection module identifies those global objects in which no local object was detected.

4. The image recognition system of claim 3, wherein the global object detection module corrects errors by removing from detection those global objects in which no local object was detected.

5. The image recognition system of claim 1, further including:
   a local object recognition module for identifying objects based on analysis of the detected local objects.

6. The image recognition system of claim 1, wherein the received image includes a plurality of images or frames of image data.

7. A computer-vision method of providing global and local object detection, the method comprising a computer-vision system for:
   receiving an image;
   detecting global objects within the received image;
   selecting regions of interest within the detected global objects;
   detecting local objects within the selected regions of interest;
   providing feedback regarding detected local objects within the detected global objects;
   correcting the detected global objects based on the provided feedback; and
   generating outputs identifying detected global objects and detected local objects.

8. The computer-vision method of claim 7, wherein selecting regions of interest within the detected global objects is based on known relationships between the global object detected and the local object to be detected.

9. The computer-vision method of claim 7, wherein the feedback regarding the detected local objects within the detected global objects identifies those global objects in which a local object was not detected within the selected region of interest.

10. The computer-vision method of claim 9, wherein correcting the detected global objects based on the provided feedback includes removing from detection global objects in which no local object was detected.

11. The computer-vision method of claim 7, wherein the received image includes a plurality of received images or frames of image data.

12. A video surveillance system for detecting objects, the system comprising:
   an image detector for detecting images;
   an image recognition system for receiving detected images from the image detector and detecting global and local objects within the received images, the image recognition system detecting global objects within the received images, selecting local regions of interest within the detected global objects, detecting local objects within the selected local regions of interest, providing feedback regarding the detected local objects, and correcting the detected global objects based on the detected local objects; and
   an output device for displaying the detected global objects and local objects.

13. The video surveillance system of claim 12, wherein the image recognition system selects local regions of interest based on known relationships between global objects and local objects to be detected.

14. The video surveillance system of claim 12, wherein the feedback regarding the detected local objects identifies those global objects in which a local object was not detected within the selected region of interest.

15. The video surveillance system of claim 14, wherein correcting the detected global objects based on the provided feedback includes removing from detection those global objects in which no local object was detected.

* * * * *